UNITED STATES PATENT OFFICE.

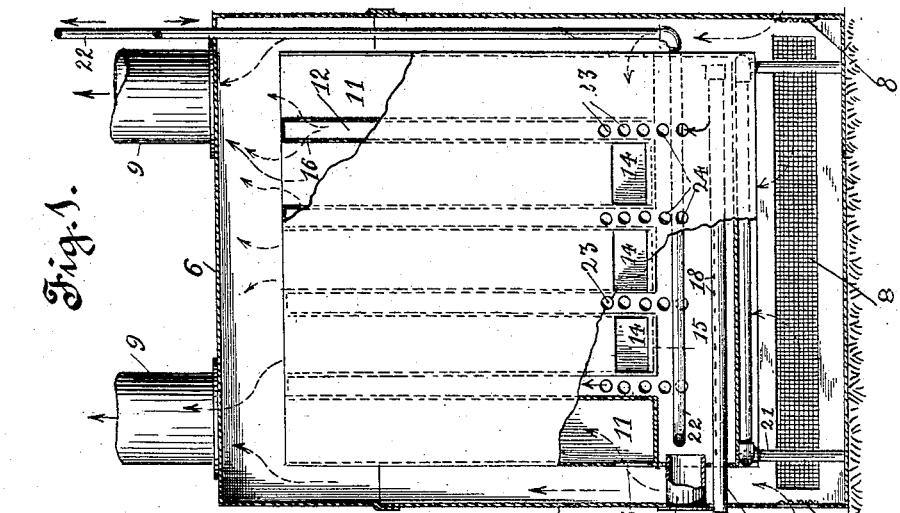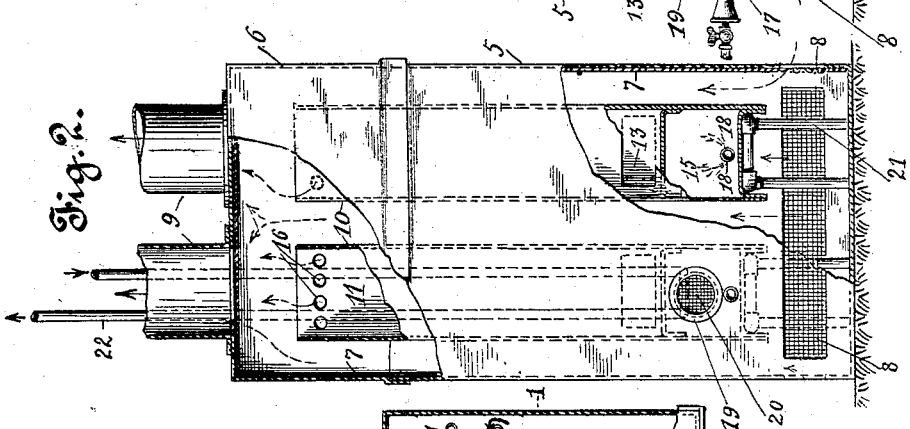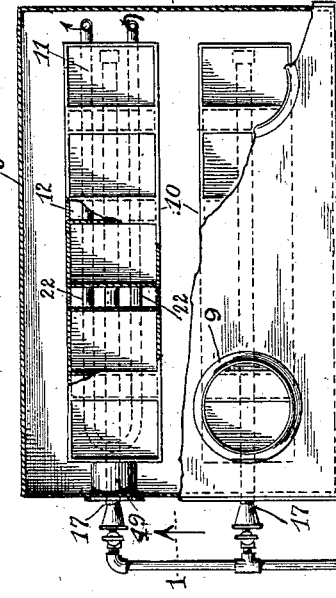

LOUIS H. FREYMUTH, OF LOS ANGELES, CALIFORNIA.

HEATING APPARATUS.

No. 915,281.

Specification of Letters Patent.

Patented March 16, 1909.

Application filed August 17, 1908. Serial No. 448,963.

*To all whom it may concern:*

Be it known that I, LOUIS H. FREYMUTH, a citizen of the United States, residing in the city of Los Angeles, county of Los Angeles, and State of California, have invented new and useful Improvements in Heating Apparatus, of which the following is a specification.

My invention relates to apparatus used for heating dwelling houses or other structures in which the fuel used is gas or other vapor fuel; and the object thereof is to produce a simple and efficient apparatus for that purpose. I accomplish this object by the apparatus described herein and illustrated in the accompanying drawings in which, Figure 1 is a section on the line 1—1 of Fig. 3, with a portion of the combustion chamber and air heating apparatus partly broken away for clearness of illustration. Fig. 2 is an end elevation, with parts broken away for clearness of illustration. Fig. 3 is a plan, with a portion of the top of the outer jacket broken away.

In the drawings the outer casing or jacket is composed of a sheet iron body 5 and a sheet iron cover 6 which may be lined with asbestos 7 if desired, the lining being omitted in the views, except in Fig. 2. The lining can be omitted if desired, but it is preferred as it prevents excessive radiation from the outer jacket. Near the bottom of the body are screened openings 8 for the passage into the jacket of the cold air. At the top are the conducting flues 9 which carry the heated air to the place of use not shown. Within the outer jacket are batteries 10 of air heating flues separated by smaller combustion flues 12. These batteries are composed of the larger air heating flues 11 which are open at the top and closed at the bottom, and the smaller and narrower combustion flues 12 which are open at the bottom and closed at the top.

In the drawings I have shown two batteries of flues each composed of 5 air heating flues and four smaller combustion flues, but any other number of flues may be used. The end flues have openings 13 through the end walls and the air heating flues intermediate the end flues have openings 14 in the side walls just above the combustion chamber 15. The combustion flues 12 at the bottom open into the combustion chamber and are connected by ports 16 near the top with the air heating flues so that the heated air which passes up the combustion flues passes out through ports 16 and joins the heated air which passes up through the other flues.

17 is a gas or other vapor burner of any approved construction which extends longitudinally through the combustion chamber 15 near the bottom thereof. This burner is preferably provided with ports 18 at each side and a little above the center of the burner as best shown in Figs. 1 and 2. 19 is a combustion air cylinder which passes through the outer jacket and into the end of the combustion chamber as best shown in Fig. 1. The outer end is provided with a screen 20 to screen the air that goes into the combustion chamber. Each battery of flues is preferably provided with a supporting frame 21, which is preferably formed of small pipe and fittings.

When the entire heating of the dwelling or other structure is to be accomplished by the use of hot air alone the foregoing comprises my improved heating apparatus, but it is sometimes desirable to provide additional heating means and to that end I provide in the combustion chamber a water heater which is composed of pipe 22 which runs from the radiator in the room to be heated, no shown, down to the outer casing and into the same at the top thence down to and enters the combustion chamber at the back thereof and then toward the front at one side of and above the burner thence crossing to the other side and following the same course as the incoming pipe back to the radiator. In the drawings I have shown only one combustion chamber equipped with water heating apparatus, but all the combustion chambers may be likewise equipped if desired. By this construction a combination of hot air and hot water heating can be used, as the same burner will heat both air and water at the same time. By a suitable arrangement of pipes, not illustrated because no part of my invention, the hot air and hot water can be conveyed to the same room for heating it, or hot water can be carried to one room for heating the same, while hot air is conveyed to another room for heating it.

In order to prevent the combustion flues from becoming too highly heated I provide a plurality of small openings or ports 23 in the end walls so that cold air may be drawn thereinto from the air that enters the outer casing. I also provide like ports 24 in the walls of the combustion chamber near the top thereof just below ports 23 for the entry thereinto of cool air. By arranging these combustion and air heating flues in batteries as shown in the drawings the air to be heated is divided up into a considerable number of ascending columns and likewise the products of combustion are divided up into a considerable number of ascending columns retained within narrow spaces thereby heating the walls and causing radiation of the heat into the air heating flues. If desired the cold air may be led into the outer casing of the furnace by a pipe leading from the outside of the building.

Having described my invention what I claim is:

1. A heating apparatus composed of an outer casing, said casing having air inlets near the bottom thereof; a battery of combustion and air heating flues within said outer casing terminating below the top of the outer casing, the combustion flues communicating with the air heating flues near the top thereof, said air heating flues being open at the top and closed at the bottom and the combustion flues being open at the bottom and closed at the top; a combustion chamber below said battery of flues in communication with the combustion flues; a vapor burner within said combustion chamber; and conducting flues connected to the top of the outer casing, said conducting flues being adapted to carry the heated air to a place of use.

2. A heating apparatus composed of an outer casing having air inlets near the bottom thereof; a battery of combustion and air heating flues within said casing, said air heating flues being open at the top and closed at the bottom and having air inlets in the side or end walls thereof near the bottom and being separated by combustion flues, said combustion flues being narrower flues than the air heating flues, and having ports in the side walls thereof near the top opening into the air heating flues and other ports in the end walls near the bottom thereof; a combustion chamber below said battery of flues; and a vapor burner within said combustion chamber.

3. A heating apparatus composed of an outer casing having air inlets near the bottom thereof; a plurality of batteries of flues within said outer casing, each battery being composed of a plurality of air heating flues closed at the bottom and open at the top separated by narrower combustion flues, said flues being in communication with each other near the top; a combustion chamber below each battery of flues in communication with the combustion flues; said combustion flues being open at the bottom and closed at the top; a vapor burner extending longitudinally each of said combustion chambers near the bottom thereof; and a water heater within one or more of said combustion chambers.

In witness that I claim the foregoing, I have hereunto subscribed my name this 11th day of August, 1908.

LOUIS H. FREYMUTH.

Witnesses:
S. B. AUSTIN,
G. E. HARPHAM.